Jan. 16, 1962 W. R. LUNDRY 3,017,578

EQUALIZER

Filed Nov. 13, 1958

INVENTOR
W. R. LUNDRY
BY
Ralph P. Holcomb
ATTORNEY

United States Patent Office 3,017,578
Patented Jan. 16, 1962

3,017,578
EQUALIZER

Walter R. Lundry, Summit, N.J., assignor to Bell Telephone Laboratories, Incorporated, New York, N.Y., a corporation of New York Filed Nov. 13, 1958, Ser. No. 773,621
2 Claims. (Cl. 330—87)

This invention relates to wave transmission networks and more particularly to an adjustable loss and delay equalizer.

The principal object of the invention is to correct distortion in a wave transmission path. A more specific object is to equalize the loss and the delay independently over a wide frequency band.

High-quality wave transmission paths, such as those used for television and data transmission, require very precise distortion correction. Preferably, the equalizers used for this purpose should have continuously and independently adjustable loss and delay characteristics.

The equalizer in accordance with the present invention is especially adapted to meet these requirements. The network is of the transversal type, with an active summing circuit. It provides a series of loss or delay shapes which may be adjusted independently. The shapes may be harmonically related and may be in the form of sine or cosine curves.

The equalizer circuit comprises a terminated delay line and a summing amplifier. The delay line has tapping points from which the main signal and the required echoes are taken off. The amplifier includes an active element with two input electrodes, two approximately equal resistors connected, respectively, from each electrode to ground, and a number of input resistors connected in parallel between the electrodes. Each of the echoes is connected through a separate resistor to an adjustable feed point on one of the input resistors. The main signal is attenuated and combined with the output of the amplifier. If the active element is an electron tube, the input electrodes are usually the grid and the cathode, and if the element is a transistor, they are preferably the base and the emitter. By using an active summing circuit, equalization can be provided over a considerably wider frequency range than is possible with a passive summing circuit including transformers.

Figure 1:
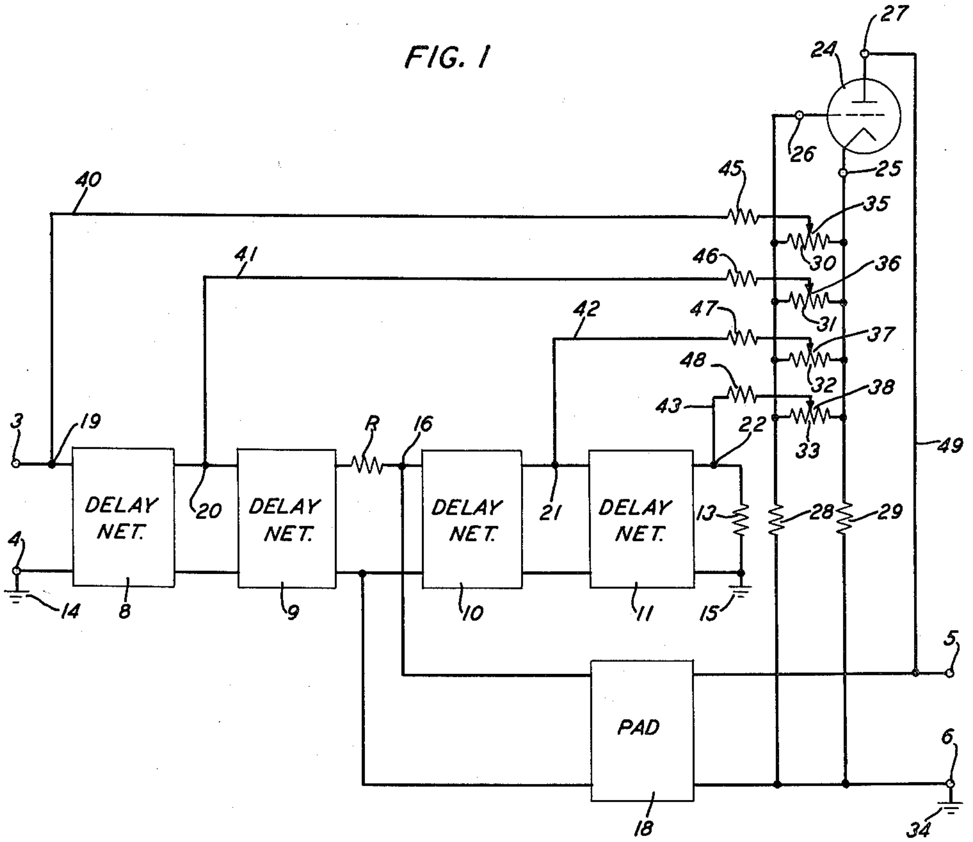
Figure 2:
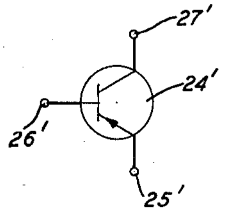

The nature of the invention and its various objects, features and advantages will appear more fully in the following detailed description of a typical embodiment illustrated in the accompanying drawing, of which:

FIG. 1 is a schematic circuit of an adjustable loss and delay equalizer in accordance with the invention and FIG. 2 is a schematic circuit of a transistor which may be substituted for the electron tube in the amplifier of FIG. 1.

The equalizer has a pair of input terminals 3, 4 for connection to the source of alternating-current signals to be equalized and a pair of output terminals 5, 6 to which the load may be connected. The delay networks 8, 9, 10, and 11 are connected in tandem to constitute a delay line which extends between the input terminals 3, 4 and the matching termination 13. The networks may be unbalanced and the delay line grounded at each end, as shown at 14 and 15. Each of the networks 8, 9, 10, and 11 is an all-pass, constant-resistance structure with an image impedance $R_0$.

The delay line is made up of an even number of delay networks. The main signal is taken off at the central point 16, attenuated in the pad 18, and impressed upon the output terminals 5, 6. The series resistor of value R at the center of the delay line is included so that the networks 10 and 11 in the second half may be designed with the same image impedance as that of the networks 8 and 9 in the first half. If the delay networks and the pad 18 have equal image impedances $R_0$, R will have a value of $R_0/2$. Thus, the network 9 will be terminated at its right-hand end in its image impedance $R_0$. The leading echoes are tapped off from the first half of the delay line at the points 19, 20, and the lagging echoes from the second half, at the points 21, 22. If more shapes are required, more pairs of delay networks may be added to provide additional tapping points.

The echoes are summed in an amplifier which includes an active element 24. In the embodiment shown in FIG. 1, this active element is an electron tube having a cathode terminal 25, a grid terminal 26, and a plate terminal 27. Two resistors 28 and 29 are connected, respectively, from the input terminals 25, 26 to ground at the point 34. These resistors are approximately equal and each may, for example, have a value of 1000 ohms. The input resistors 30, 31, 32, and 33, equal in number to the number of echoes, are connected in parallel in a path between the input terminals 25, 26. The value of each of these input resistors depends upon the required adjustment range of the associated equalizer shape. The parallel impedance of all of the input resistors is preferably about the same as that of each of the resistors 28 and 29. In the present example, each of the resistors 30 to 33 may have a value of 4000 ohms. These resistors have adjustable feed points 35, 36, 37, and 38. The transmission paths 40, 41, 42, and 43, which include, respectively, series resistors 45, 46, 47, and 48, connect the points 19, 20, 21, and 22 on the delay line to the feed points 35, 36, 37, and 38. Each of the resistors 45, 46, 47, and 48 has a value high compared to $R_0$ so that the impedance between the tapping point on the delay line and ground will be sufficiently high to avoid an impedance mismatch large enough to cause undesired reflections. If, for example, $R_0$ is 75 ohms, each of these resistors may have a value of 1500 ohms.

The output of the amplifier tube 24 is combined with the main signal through the path 49 from the plate terminal 27 to the output terminal 5. The pad 18 is included in the main path to isolate the output of the summing amplifier from the point 16 on the delay line.

In a modified embodiment of the equalizer in accordance with the invention, the transistor 24', shown symbolically in FIG. 2, may be substituted for the tube 24 in FIG. 1. The emitter terminal 25', base terminal 26', and collector terminal 27' correspond, respectively, to the terminals 25, 26, and 27 of the tube 24.

The operation of the equalizer shown in FIG. 1 will now be considered. When the feed points 35, 36, 37, and 38 on the associated resistors 30, 31, 32, and 33 are all centered, the equalizer will introduce neither delay nor loss equalization shapes. If the networks 8, 9, 10, and 11 all have equal delays, the equalizer may be adjusted to provide harmonically related equalization shapes. Also, if these networks have phase shifts which are linear with frequency, the shapes will be either sinusoidal or cosinusoidal in form.

The two feed points associated with a pair of leading and lagging echoes are moved equal distances in the same direction for delay equalization, and equal distances in opposite directions for loss equalization. For example, if the points 36 and 37 are moved off center equal distances to the left, the equalizer will provide a first harmonic, substantially pure delay equalization shape. Alternatively, if these points are moved equal distances to the right, an inverse pure delay shape will result. To get substantially pure loss equalization shapes, the points 36 and 37 are moved equal distances off center in opposite directions. Moving the point 36 to the left and the point 37 to the right results in a certain loss shape.

Moving the point 36 to the right and the point 37 to the left produces an inverse loss characteristic. Thus it is apparent that both delay and loss adjustments may be made with each pair of tapping points.

Substantially pure, second-harmonic delay or loss equalization shapes may be provided by adjusting the second pair of feed points 35 and 38 along the resistors 30 and 33, in the manner just described with respect to the points 36 and 37. Additional equalizer shapes may be provided by adding more pairs of delay networks and the required associated elements.

If pure delay or loss shapes are not needed, either the delay networks in the leading half of the line or those in the lagging half, and the associated elements, may be omitted. For example, either the networks 8 and 9 or the networks 10 and 11 may be omitted. Adjustment of the remaining tapping points on the input resistors will give a series of loss shapes and associated delay shapes. If the networks 8 and 9 are omitted and only the lagging echoes used, the equalizer falls into a class which has been called minimum phase networks.

It is to be understood that the above-described arrangement is only illustrative of the application of the principles of the invention. Numerous other arrangements may be devised by those skilled in the art without departing from the spirit and scope of the invention.

What is claimed is:

1. A wave transmission network comprising input terminals and output terminals, a terminated delay line connected to the input terminals, a transmission path from the center of the line to the output terminals, a loss pad of image impedance $R_0$ connected in the path, a plurality of pairs of tapping points symmetrically positioned with respect to the center of the line, a summing amplifier including an active element having two input electrodes, substantially equal resistors connected, respectively, between the electrodes and an output terminal, a plurality of input resistors connected in parallel between the electrodes, a transmission path from each tapping point to a point on one of the input resistors, a series resistor in each of the last-mentioned paths, a transmission path from the output of the amplifier to the output terminals, and a resistor connected in series at the center of the line at a point before the said transmission path from the center of the line, the line being constituted by tandem-connected delay networks of image impedance $R_0$ and the last-mentioned resistor having a resistance approximately equal to $R_0/2$.

2. A network in accordance with claim 1 in which the parallel resistance of the input resistors is approximately equal to the resistance of each of the substantially equal resistors.

References Cited in the file of this patent

UNITED STATES PATENTS

| | | |
|---|---|---|
| 2,353,876 | Cowein | July 18, 1944 |
| 2,396,531 | Reiskind et al. | Mar. 12, 1946 |
| 2,759,044 | Oliver | Aug. 4, 1956 |
| 2,760,164 | Graham | Aug. 21, 1956 |

OTHER REFERENCES

Corrington et al.: RCA Review, vol. 15, No. 2, June 1954, pages 178–180.